April 14, 1959 — R. H. P. DEVAUX — 2,881,819
NUT WITH COIL SPRING LOCKING MEANS
Filed May 28, 1956
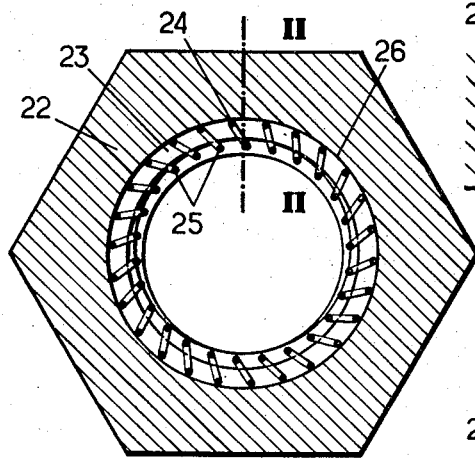
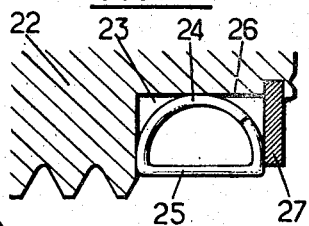
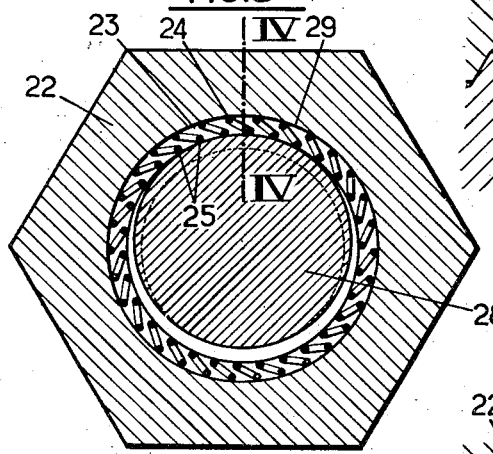
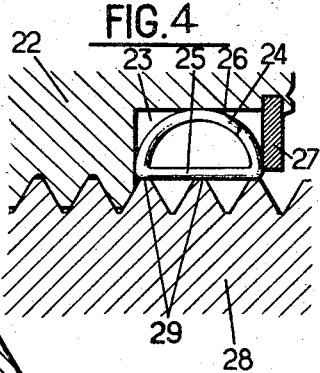
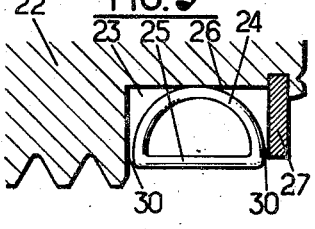
INVENTOR
Raymond H. P. Devaux
By Holcomb, Wetherill & Buchris
ATTORNEYS

United States Patent Office 2,881,819
Patented Apr. 14, 1959

2,881,819

NUT WITH COIL SPRING LOCKING MEANS

Raymond Henri Pierre Devaux, Paris, France, assignor to Societe Anonyme Schobesta, Vaduz, Liechtenstein, a body corporate of Liechtenstein Application May 28, 1956, Serial No. 587,856

Claims priority, application France May 28, 1955

1 Claim. (Cl. 151—25)

This invention relates to a nut which may be readily screwed on to a threaded rod, but which is provided with means hindering accidental unscrewing of the said nut while permitting the nut to be unscrewed at will when this is necessary.

The term "nut" is used in this specification in a broad sense as meaning any member which is provided with a screw threaded hole for the reception of a similarly threaded member.

A nut is known which is provided with means for preventing it from becoming accidentally unscrewed, the said means comprising a ball disposed in a seating leading to the base or throat of a thread of the nut. The said ball, urged by a resilient means, binds on the thread of the rod on to which the nut is screwed and this resilient means (generally a spring) may be rendered inoperative in order to free the ball from any thrust, thus permitting the nut on the rod to be tightened or loosened as desired. However, such a known device is relatively costly and difficult to make, because it is necessary to ensure that the seating of the ball forms an orifice which is symmetrical with respect to the base of a thread.

It is also known to provide a nut with a helical spring which is either seated in a groove formed in the nut in such manner as to permit it to be engaged in the hollow of a thread, or it is held in a circular internal groove formed in a washer in such manner as to project on the inside of this washer, which is adapted to be engaged on a threaded rod when the nut is tightened. This type of nut, however, has the disadvantage that it does not ensure a constant braking effect with respect to the rod during the time that the nut is being tightened or loosened, and on the other hand, it causes rapid wear on the threads in the event of repeated screwing and unscrewing operations.

According to the invention there is provided a nut having a recess which cuts into the bases of at least two of the threads of the nut and a braking member disposed within said recess and adapted to hinder unscrewing of the nut from a threaded rod engageable in said nut, said braking member having a portion or portions adapted to bear against the crests of at least two threads of the rod and the braking member being resiliently formed, or cooperating with resilient means, so that in operation the said portion or portions is or are urged into braking engagement with the said threads of the rod.

The braking member may be a helical spring each of whose convolutions is provided with a flattened portion. Thus the spring may be a straight spring disposed in a straight recess, the flattened portions of the spring lying in a plane parallel to the axis of the spring. Alternatively the spring may be an annular spring disposed in an annular recess, the inner part of each convolution of the spring being flattened so that the said inner parts are disposed along a substantially cylindrical surface.

A clearance may be provided between the braking member and the sides of the recess whereby the braking member may turn in the recess when the nut is screwed onto or unscrewed from a threaded rod.

The invention is illustrated, merely by way of example, in the accompanying diagrammatic drawings in which:

Figure 1 is a section, perpendicular to the axis, of another modified nut according to the invention;

Figure 2 is a section on the lines II—II of Figure 1;

Figure 3 is a section of the nut shown in Figure 1, when it is screwed on to a threaded rod;

Figure 4 is a section on the line IV—IV of Figure 3; and

Figure 5 is a section similar to that of Figure 2, but illustrating a modification of the nut shown in Figure 1.

Figures 1 to 4 show a nut 22 formed with an annular groove 23 in which is disposed an annular spring 24 having a flat portion 25. The spring 24 can be obtained by starting from a helical spring, the convolutions of which have been flattened along one generatrix, this spring then being rolled and its ends joined in such manner that the flat portion 25 is, throughout its length, disposed parallel to the external cylindrical surface 26 of the groove 23. The annular spring 24 is held in the groove 23 by a suitably fitted washer 27.

When the nut 22 is engaged on a threaded rod 28, it may be screwed by exerting a predetermined force, the flat portion 25 of the spring 24 being adapted to rub on the crests of at least two threads 29 of the rod 28. If after having tightened the nut 22, it is desired to release the latter, it is necessary to start by exerting a force very much greater than the aforementioned predetermined force, in such manner as to obtain a rocking of the convolutions of the spring 24, and then it is sufficient to exert the aforementioned predetermined force in order to continue the unlocking movement.

As a result of the arrangement which has just been described, it will be seen that the crests of the screw-threads of the rod 28 are likely to be subjected to slight degree of wear, but this does not however present any serious disadvantage, because contrary to that which obtains with certain known locking devices, the flanks of the threads are not subjected to any wear at all. However, this wear may itself be avoided by the spring 24 being provided, as shown in Figure 5, with a slight axial clearance 30 in its seating 23. Under these conditions, the spring 24 may turn in the groove 23 during the screwing or unscrewing movement, and the only friction which is applied is in practice that of the spring 24 against the surface 26 of the groove 23.

I claim:

A threaded nut provided with an internal annular recess coaxial with said nut and a helical spring positioned in said recess, each of the convolutions of said spring being provided with a flattened inner portion adapted to engage the crests of at least two of the threads of a mating bolt and having an axial length less than that of said recess but equal to at least twice the pitch of the threads in said nut, the diameter of the helix formed by said spring being slightly greater than the depth of said recess, so that when the convolutions of said spring are transversely disposed with respect to said recess they project beyond the root diameter of the threads of said nut so as to be pressed strongly against the outer wall of said recess by said bolt and serve as a friction lock against rotation of said nut with respect to said bolt, but when said convolutions are skewed with respect to said recess they bear only lightly against said outer recess wall, said convolutions being contoured to curve away from said outer recess wall so as to have only a minimum frictional contact therewith when in the latter position, and provide a clearance space between said recess wall and spring into which said spring may retreat when strongly pressed by said bolt.

References Cited in the file of this patent

UNITED STATES PATENTS

| | | |
|---|---|---|
| 1,542,073 | Martin | June 16, 1925 |
| 1,791,017 | Sundh | Feb. 3, 1931 |
| 1,809,620 | Cole | June 9, 1931 |
| 2,107,550 | Schmidt | Feb. 8, 1938 |
| 2,386,197 | Dawson | Oct. 9, 1945 |

FOREIGN PATENTS

| | | |
|---|---|---|
| 79,904 | Sweden | Feb. 27, 1933 |